United States Patent  
Westre et al.

(10) Patent No.: US 7,115,323 B2  
(45) Date of Patent: Oct. 3, 2006

(54) TITANIUM FOIL PLY REPLACEMENT IN LAYUP OF COMPOSITE SKIN

(75) Inventors: Willard Westre, Bellevue, WA (US); David W. Evans, Kent, WA (US); Edward Li, Seattle, WA (US); Marc J. Piehl, Renton, WA (US); Eric Sager, Seattle, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 10/650,231

(22) Filed: Aug. 28, 2003

(65) Prior Publication Data

US 2005/0048246 A1 Mar. 3, 2005

(51) Int. Cl.
B32B 3/12 (2006.01)
B32B 15/08 (2006.01)

(52) U.S. Cl. .................. 428/593; 428/608; 428/58; 428/61; 428/77; 428/78; 428/189; 244/131; 244/133

(58) Field of Classification Search ............... 428/58, 428/61, 608, 593, 77, 78, 49, 189; 244/133, 244/131
See application file for complete search history.

(56) References Cited

U.S. PATENT DOCUMENTS

| 2,397,415 | A | * | 3/1946 | Ghez et al. ............ 428/136 |
|---|---|---|---|---|
| 5,160,771 | A | | 11/1992 | Lambing et al. |
| 5,578,384 | A | | 11/1996 | Kingston |
| 5,693,157 | A | | 12/1997 | Kingston |
| 5,866,272 | A | | 2/1999 | Westre et al. |
| 6,039,832 | A | | 3/2000 | McCarville |
| 6,114,050 | A | | 9/2000 | Westre et al. |
| 6,194,081 | B1 | | 2/2001 | Kingston |
| 6,320,118 | B1 | | 11/2001 | Pridham et al. |
| 6,465,110 | B1 | | 10/2002 | Boss et al. |

FOREIGN PATENT DOCUMENTS

WO   WO 00/56541   9/2000

* cited by examiner

*Primary Examiner*—Alexander S. Thomas
(74) *Attorney, Agent, or Firm*—Black Lowe & Graham, PLLC

(57) ABSTRACT

Laminate structures and methods for forming same are disclosed. In one embodiment, a laminate structure includes a metal-polymer composite lamina. The metal-polymer composite lamina has a first face and a second face spaced apart, and extends to a terminal edge. The lamina includes a ply of fiber-reinforced polymer that extends between the first face and the second face and has an interior edge. The interior edge defines at least one cutout. A ply of metal foil extends between the first face and the second face substantially from the interior edge filling the at least one cutout.

28 Claims, 3 Drawing Sheets

TITANIUM FOIL PLY REPLACEMENT IN LAYUP OF COMPOSITE SKIN

FIELD OF THE INVENTION

This invention relates generally to aircraft skin panels of laminate structure and, more specifically, to introduction of foil into laminates to impart strength.

BACKGROUND OF THE INVENTION

Airframe manufacturers have found that skins of graphite, boron, or a blend of graphite and boron composite (collectively "polymeric composite") unidirectional tape can be strengthened by the introduction of titanium foil between laid up plies of polymeric composite unidirectional tape. For example, U.S. Pat. No. 5,866,272 to Westre et al., incorporated by this reference, is one of several patents teaching the placement of titanium foil between plies of polymeric composite unidirectional tape.

The resulting skin including a titanium foil makes up for a bearing deficiency of non-titanium containing polymeric composite panels, which ordinarily will not bear loads or hold pins well. In addition, composite construction is typically one-third of the density of titanium. Titanium has a relatively low fatigue strength and relatively high crack growth rates. Introducing titanium foil to the polymeric composite skins yields a resulting hybrid that exploits the strengths of polymeric composite and titanium construction. With the introduction of sufficient titanium foil, the resulting skin approaches and can surpass the strength properties of either material alone.

Traditionally, adding plies of polymeric composition has made pad-ups for joints and higher-loaded areas of composite panels. The added plies are laid up in balanced and symmetric manner to form a ramp at the site of the pad-up. These pad-ups add strength at points in the skin without the addition of weight by uniform addition of material across the skin. Recently, the virtues of introduction of titanium foil have been achieved by padding up by adding titanium foil plies.

The selective introduction of titanium foil at places of greater pin bearing loads causes a resulting skin of non-uniform thickness. The transition in thickness from polymeric composite skin alone to reinforced hybrid composite skin is known as a ramp. Fastening parts to pad-ups typically requires complex machining and close tolerances to conform to the ramp. Such considerations mean greater expense in manufacturing.

Additionally, as the thickness of the composite skin increases, the bolt bending stresses increase, consequently decreasing the strength of skin at the bolthole. For this reason, minimizing of the pad-up is advantageous. Thus, there is an unmet need in the art for a method of introducing titanium foil to a polymeric composite lay-up in a manner to reduce the pad-up and ramp length.

SUMMARY OF THE INVENTION

The present invention is directed to laminate structures and methods for laying up laminate structures. In one embodiment, the laminate structure includes a metal-polymer lamina. The metal-polymer lamina has a first face and a second face spaced apart, and extends to a terminal edge. The lamina includes a ply of fiber-reinforced polymer that extends between the first face and the second face and has an interior edge. The interior edge defines at least one cutout. A ply of metal foil extends between the first face and the second face substantially from the interior edge filling the at least one cutout.

In accordance with further aspects of the invention, the fiber-reinforced polymer includes a fiber selected from the group consisting of aramids, polyolefins, glass, carbon, boron, and ceramics.

In accordance with other aspects of the invention, the metal foil includes a metal selected from the group consisting of alloys of titanium, alloys of aluminum, and alloys of iron.

In accordance with still further aspects of the invention, the polymer includes a thermosetting or a thermoplastic resin, or a hybrid polymer resin with qualities of both resins.

In accordance with yet other aspects of the invention, the laminate structure further includes a polymer lamina. The polymer lamina has a third face and a fourth face spaced apart. The polymer lamina includes a ply of fiber-reinforced polymer extending between the third face and the fourth face and extending substantially to the terminal edge.

BRIEF DESCRIPTION OF THE DRAWINGS

The preferred and alternative embodiments of the present invention are described in detail below with reference to the following drawings.

DETAILED DESCRIPTION OF THE INVENTION

The present invention generally relates to laminate structures including a titanium layer, and methods of laying up the same. Many specific details of certain embodiments of the invention are set forth in the following description and in FIGS. 1–3 to provide a thorough understanding of such embodiments. One skilled in the art, however, will understand that the present invention may have additional embodiments, or that the present invention may be practiced without several of the details described in the following description.

By way of overview, in one embodiment in accordance with the present invention, a laminate structure includes a metal-polymer composite lamina. The metal-polymer composite lamina has a first face and a second face spaced apart, and extends to a terminal edge. The lamina includes a ply of fiber-reinforced polymer that extends between the first face and the second face and has an interior edge. The interior edge defines at least one cutout. A ply of metal foil extends between the first face and the second face substantially from the interior edge filling the at least one cutout.

Figure 1:
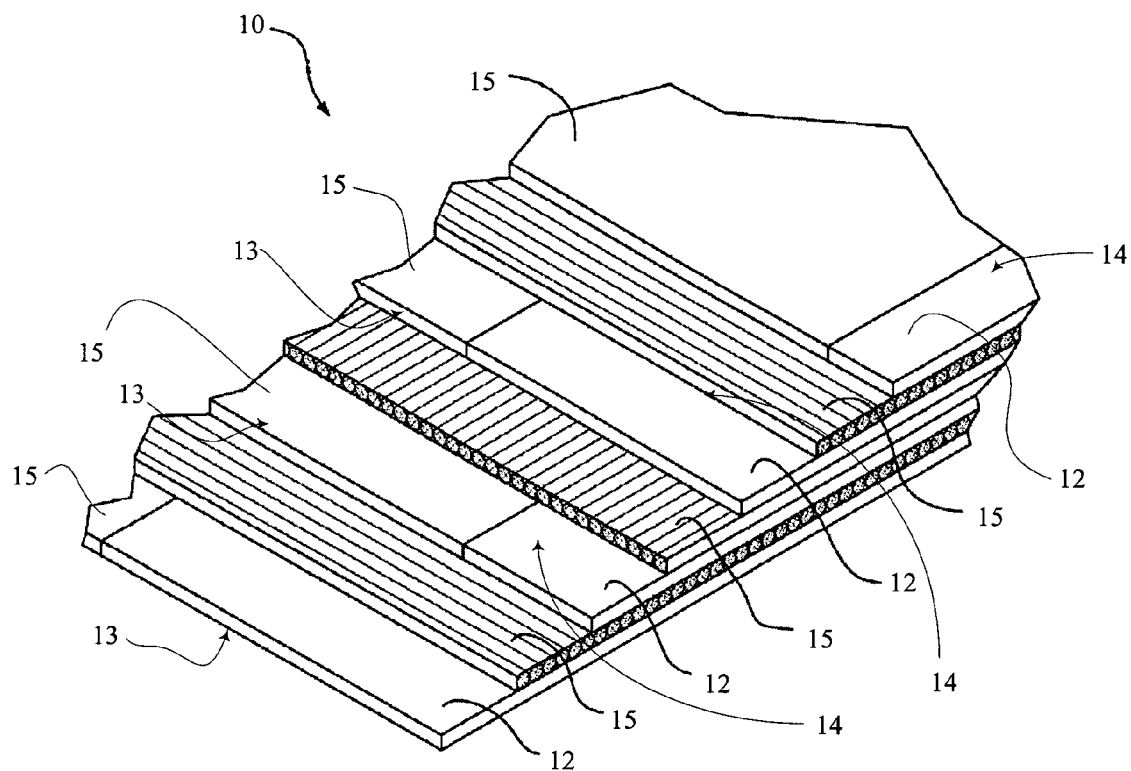
FIG. 1 is an isometric partial sectional view of several laminae of a TiGr laminate in accordance with an embodiment of the present invention.

FIG. 1 is an isometric partial sectional view of several laminae of a titanium-graphite (TiGr) laminate 10 in accordance with an embodiment of the present invention. In this embodiment, the laminate 10 includes several laminae of titanium foil 12 interleaved with several laminae of fiber-reinforced polymer 15. The fibers of the fiber-reinforced polymer 15 may be formed of a variety of known materials, including, for example, aramids, polyolefins, glass, carbon, boron, ceramics, or any other suitable fiber material, and may be disposed within a resin. Throughout this application, resin includes either a thermosetting or a thermoplastic resin, or a hybrid polymer resin with qualities of both resins. Alternately, the fibers may simply be eliminated within a ply to form a gap between the graphite fiber and the metal foil. Similarly, the metal layer 12 may be formed of a variety of metallic materials, including, for example, copper, titanium, aluminum, alloys of titanium (e.g. Ti-6Al-4V, Ti-15V-3Cr-3Sn-3Al and Ti-15Mo-3Al-3Nb), alloys of aluminum, alloys of iron, or any other suitable metallic materials. One purpose for the introduction of the titanium foil 12 is to enhance the pin load bearing ability of a panel such as an aircraft skin, for example, around the landing gear attachment points. As further shown in FIG. 1, the adjacent layers of fiber-reinforced polymeric material 15 and titanium-containing layers 13 may be bonded with a suitable adhesive, including, for example, a thermo-setting epoxy resin or other suitable adhesive.

Figure 2:
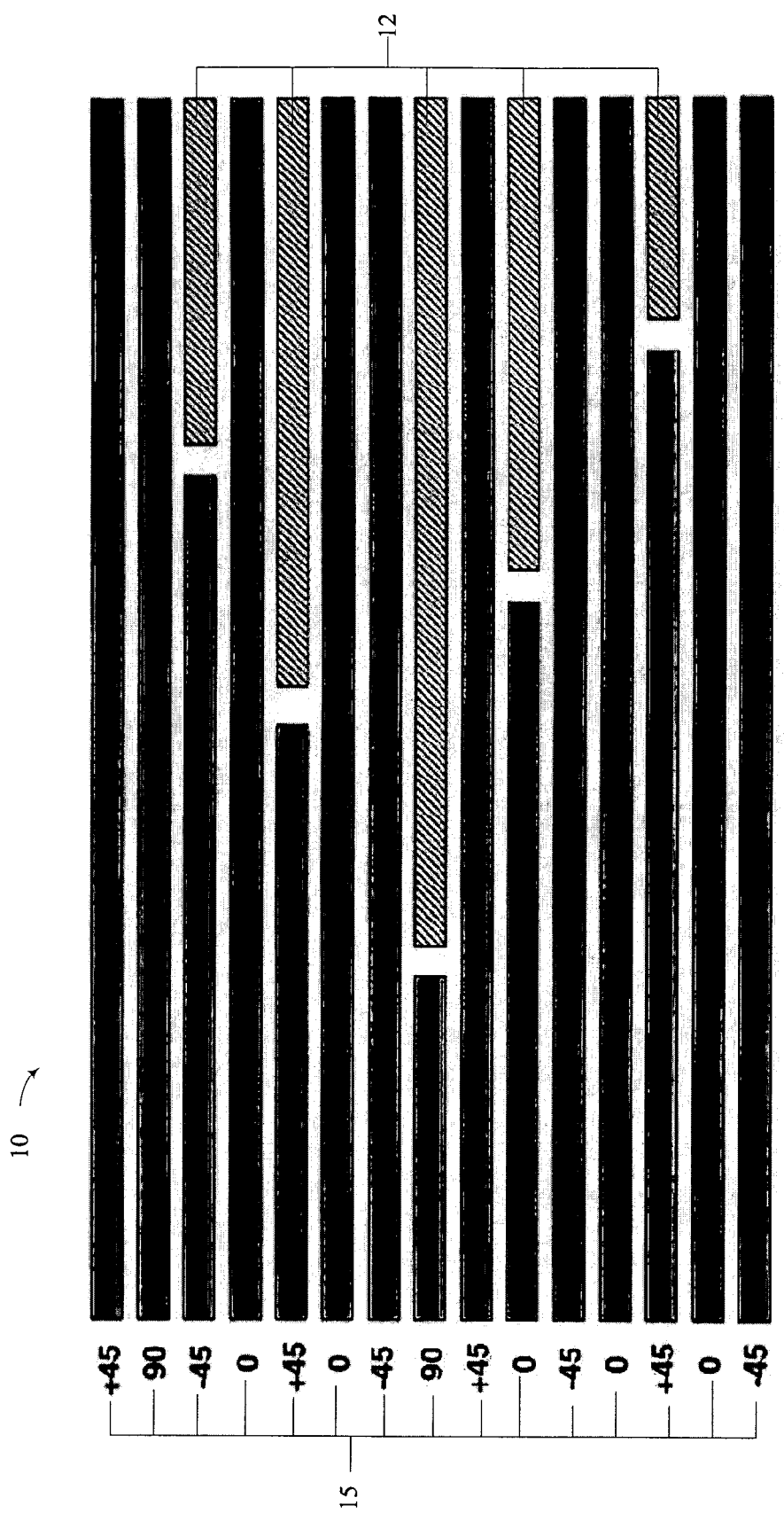
FIG. 2 is a side cross-sectional view of an exemplary lay up of a TiGr laminate in accordance with an embodiment of the present invention.

FIG. 2 is a side cross-sectional view of an exemplary lay up of a TiGr laminate 10 in accordance with an embodiment of the present invention. Unlike the Westre patent (e.g., U.S. Pat. No. 5,866,272), which teaches interleaving titanium foil 12 with fiber-reinforced polymeric material 15 resulting in a pad-up in the skin, the inventive laminate structure 10 includes a lay-up that interrupts several layers of the fiber-reinforced polymeric material 15 at points of greater pin load bearing requirements, resulting in a uniform thickness, as described more fully below.

As best shown in FIG. 1, in laying up a single titanium containing layer 13, areas requiring specific titanium reinforcement are designated. At the designated areas, a cutout 14 is formed. The cut-out 14 may be formed, for example, by removing the fiber-reinforcing polymer 15 up to an interior edge, or by simply laying up fiber-reinforcing polymer 15 up to an interior edge, leaving the formed cutout 14. Suitable lay up devices for forming the cutouts 14 include, for example, conventional contour tape-laminating machines, such as those manufactured by Cincinnati Machine, Incorporated. The titanium containing layer 13 is then completed with titanium foil 12 to substantially fill each cutout 14.

As further shown in FIG. 1, where multiple titanium-containing layers 13 are to be interrupted, it may be advantageous to stagger interior edges of the cutouts 14 in order to prevent the overlay of two or more interior edges. Because of the distinct properties of the fiber-reinforced polymer 15 and the titanium foil 12, the staggering of the interior edges spreads the transition area between the fiber-reinforced polymer 15 and the titanium foil 12 in the TiGr laminate 10. Additionally, the interleaving of titanium foil 12 using one or more cutouts 14 to create a local additional lamina may advantageously allow the adjacent fiber-reinforced polymer layers 15 to continue across the titanium foil 12. The addition of the lamina causes the pad up of the thickness of the laminate 10. As will readily be appreciated by those skilled in the art, the distinct strategies of interleaving titanium foil 12 to create a new lamina as disclosed in the Westre patent and interrupting the fiber-reinforced polymeric material 15 in a single titanium containing layer 13 with a titanium foil 12 in accordance with the present invention may yield distinct properties in the resulting laminate 10. In accordance with alternate embodiments of the invention, other laminates may be built with both strategies to optimize the pin load bearing performance.

Figure 3:
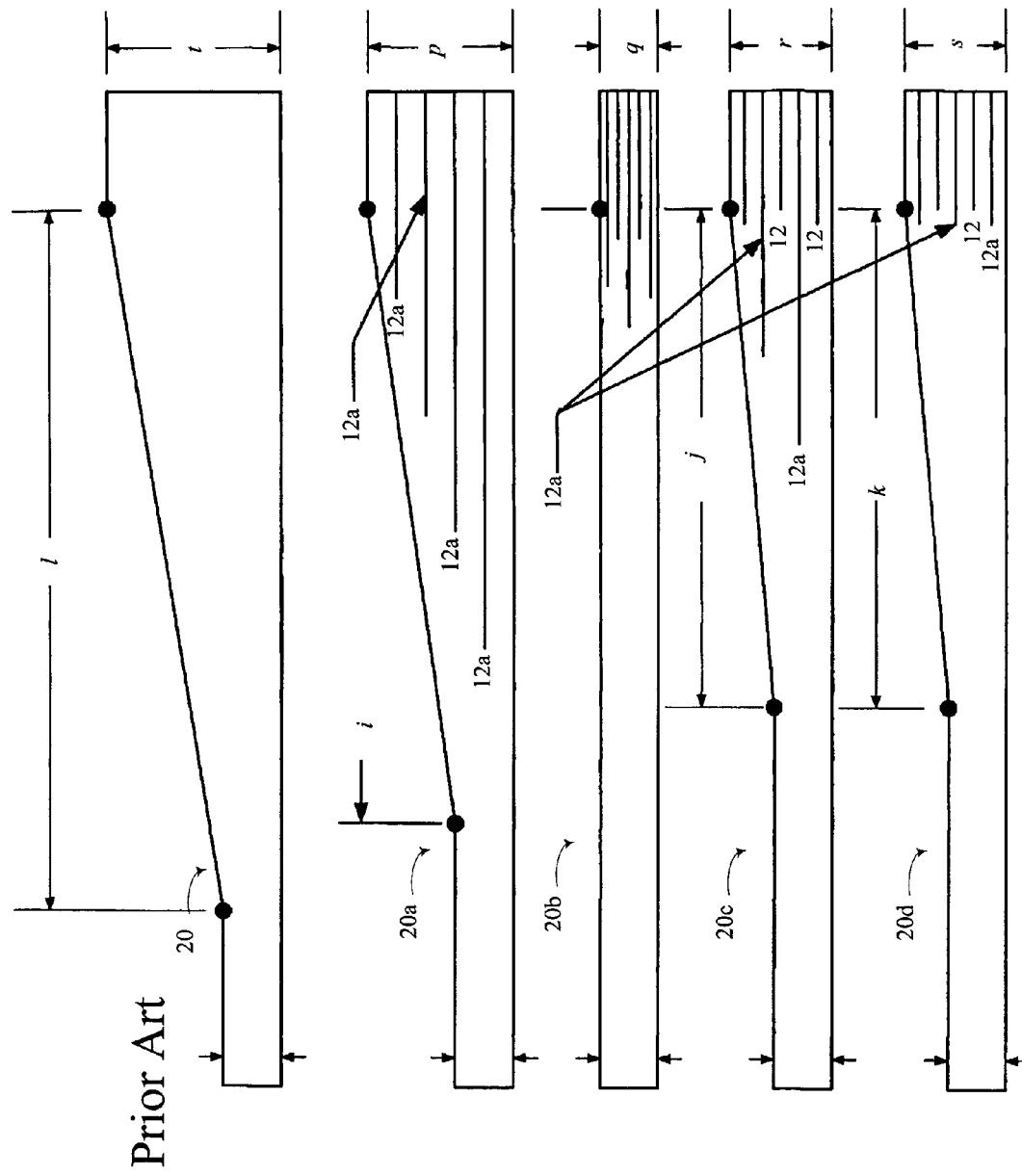
FIG. 3 is a comparison of profiles of pad-ups for prior art laminate structures and laminate structures of comparable strength in accordance with embodiments of the present invention.

FIG. 3 is a comparison of profiles of pad-ups of prior art laminate structures and laminate structures of comparable strength in accordance with embodiments of the present invention. Specifically, a pad-up laminate 20 in accordance with the prior art is shown. The laminate pad-up 20 is characterized by a transition from a first non-titanium containing skin thickness t1 to a full pad-up (or second non-titanium containing skin thickness) t2 by a characteristic ramp having a length l1. Westre et al. teaches a prior art laminate pad-up 20a where all of the titanium foil is simply interleaved titanium foil 12a, rather than added in as interrupted laminae of titanium foil 12 as taught by the present disclosure. Thus, the prior art pad-up of Westre et al. has a ramp with greatest length i and greatest thickness p. In contrast, a laminate 20b made exclusively with the inventive method of interrupting the fiber-reinforced polymeric layer 15 with titanium foil 12 formed in a cutout 14 in the titanium-containing layer 13 as described herein, has no appreciable pad-up, thus eliminating the ramp, and having a thickness q that is substantially the same as the surrounding skin.

With continued reference to FIG. 3, two hybrid laminates, 20c and 20d, show alternate configurations having both the interleaved titanium foil layers 12a and the inventive layers 13 (see FIG. 1) having a cutout 14 and including titanium foil 12 within the cutout 14. Where the interleaves extend nearly to the anticipated profile of the ramp, the laminate 20c results having a ramp of j in length and a thickness of r. Generally, the ramp lengths j, k in the laminate structures 20c, 20d are shorter than the ramp lengths l, i of the prior art laminate structures 20, 20a. In one aspect of the present invention, the ramp length of the inventive laminate structures 20c, 20d may be decreased in proportion to the ratio of the number of interleaved titanium foils 12a to the total number of titanium foils 12 and 12a. Similarly, the thicknesses r, s of the pad-up of the laminate structures 20c, 20d are thinner the thicknesses $t_2$, p of the pad-up of the prior art laminate structures 20, 20a. Again, in a particular aspect of the present invention, the difference in thickness may be proportional to the ratio the number interleaved titanium foils 12a bears to the total number of titanium foils 12 and 12a.

Because titanium is more dense than the fiber-reinforced polymeric material 15, savings in weight can be achieved by reducing the amount of titanium in the laminate structure by forming the titanium foil 12 within a cutout 14 in a layer 13, rather than allowing the interleaved titanium foil 12a to fully extend toward the profile of the ramp as practiced in the prior art. Interestingly, the profile of a ramp on a laminate 20d, has roughly the same length k as the ramp length j of the laminate 20c. Again, similarly, the profile of a ramp on a laminate 20d, has roughly the same thickness s as the thickness r of the laminate 20c. Thus, shortening the titanium foils 12a may result in a weight savings without significantly changing the pad-up profile.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A laminate structure, comprising:
   a first region having a non-uniform thickness, the first region including:
   a first layer having:
   a first portion of a non-metallic material, the first portion at least partially encompassing a cutout region;

a second portion of a metallic material formed within the cutout region, the second portion abutting the first portion;

a second layer adjacent the first layer that non-interruptably extends along the first layer, the second layer being formed from a non-metallic material; and a third layer having a first portion of a non-metallic material, the first portion at least partially encompassing a cutout region, and a second portion of a metallic material formed within the cutout region, the second portion being co-planar with the first portion, and wherein the second layer is disposed between the first and third layers.

2. The laminate structure of claim 1, wherein the first portion includes a fiber-reinforced polymeric material.

3. The laminate structure of claim 1, wherein the first portion includes a fiber-reinforced polymeric material having one or more fibers formed from a material selected from a group consisting of aramids, polyolefins, glass, carbon, boron, and ceramics, and wherein the metallic material of the second portion is formed from a material selected from a group consisting of titanium, aluminum, alloys of titanium, alloys of aluminum, and alloys of iron.

4. The laminate structure of claim 1, further comprising a second region integrally coupled to the first region by one or more layers of non-metallic material, the first layer of the first region not extending into the second region.

5. The laminate structure of claim 4, wherein the first region includes a minimum-thickness portion, the second region being integrally coupled to the minimum-thickness portion and having a thickness approximately equal to the minimum thickness portion of the first region.

6. The laminate structure of claim 4, wherein the second region consists essentially of one or more non-metallic layers.

7. The laminate structure of claim 4, wherein the second region consists essentially of one or more non-metallic layers.

8. A laminate structure comprising:
a first region having a non-uniform thickness, the first region including:
a metal-polymer lamina, the metal-polymer lamina having a first face and a second face spaced apart from the first face, extending to a terminal edge, the lamina including:
a ply of fiber-reinforced polymer extending between the first face and the second face and having at least one interior edge, the interior edge defining at least one cutout;
a ply of metal foil extending between the first face and the second face substantially from the interior edge to fill the at least one cutout; and
a polymer lamina adjacent the metal-polymer lamina, the polymer lamina having a third face and a fourth face spaced apart from the third face, the polymer lamina including a ply of fiber-reinforced polymer that extends between the third face and the fourth face and extends non-interruptably along the metal-polymer lamina and substantially to the terminal edge.

9. The laminate structure of claim 8, wherein the metal-polymer lamina further includes a periphery and the terminal edge further defines the at least one cutout abutting the periphery.

10. The laminate structure of claim 8, wherein the metal-polymer lamina further includes an interior, the interior edge defining the at least one cutout within the interior.

11. The laminate structure of claim 8, wherein the fiber-reinforced polymer includes a fiber selected from a group consisting of aramids, polyolefins, glass, carbon, boron, and ceramics.

12. The laminate structure of claim 8, wherein the metal foil includes a metal selected from a group consisting of titanium, aluminum, alloys of titanium, alloys of aluminum, and alloys of iron.

13. The laminate structure of claim 12, wherein the alloys of titanium are selected from a group consisting of (Ti-6Al-4V), (Ti-15V-3Cr-3Sn-3Al) and (Ti-15Mo-3Al-3Nb).

14. The laminate structure of claim 8, further comprising a second region integrally coupled to the first region by one or more layers of non-metallic material, the metal-polymer lamina of the first region not extending into the second region.

15. The laminate structure of claim 8, wherein the first region includes a minimum-thickness portion, the second region being integrally coupled to the minimum-thickness portion and having a thickness approximately equal to the minimum thickness portion of the first region.

16. The laminate structure of claim 8, wherein the second region consists essentially of one or more non-metallic layers.

17. The laminate structure of claim 8, wherein the metal polymer lamina is a first metal-polymer lamina, the laminate structure further comprising a second metal-polymer lamina coupled to the first metal-polymer lamina.

18. The laminate structure of claim 17, wherein the laminate structure further comprises the adhesive resin interposed between the first metal-polymer lamina and the second metal-polymer lamina to adhesively fuse the first metal-polymer lamina to the second metal-polymer lamina.

19. The laminate structure of claim 18, wherein the first metal-polymer lamina has a first interior edge and the second metal-polymer lamina has a second interior edge and the first interior edge is not co-terminous with the second interior edge.

20. The laminate structure of claim 8, wherein the laminate structure further comprises the metal-polymer lamina and metal foil lamina, the metal foil lamina having a fifth face and a sixth face spaced apart from the fifth face and including:
a ply of metal foil extending between the fifth face and the sixth face.

21. The laminate structure of claim 20, wherein the laminate structure further comprises the adhesive resin uniformly interposed between the metal-polymer lamina and the metal lamina to adhesively fuse the metal-polymer lamina to the metal lamina.

22. A laminate structure comprising:
a first region having a non-uniform thickness, the first region including:
a metal-polymer lamina, the metal-polymer lamina having a first face and a second face spaced apart from the first face, extending to a terminal edge, the lamina including:
a ply of fiber-reinforced polymer extending between the first face and the second face and having an interior edge, the interior edge defining at least one cutout; and
a ply of metal foil extending between the first face and the second face substantially from the interior edge to fill the at least one cutout;
a fiber-reinforced polymer lamina, the polymer lamina having a third face and a fourth face spaced apart, extending to the terminal edge, the lamina including:

a ply of fiber-reinforced polymer extending non-interruptably along the metal-polymer lamina and substantially to the terminal edge; and an adhesive resin interposed between the metal-polymer lamina and the fiber-reinforced polymer lamina to adhesively couple the metal-polymer lamina to the fiber-reinforced polymer lamina.

23. The laminate structure of claim 22, wherein the metal-polymer lamina further includes a periphery and the terminal edge further defines the at least one cutout abutting the periphery.

24. The laminate structure of claim 22, further comprising a second region integrally coupled to the first region by one or more layers of non-metallic material, the metal-polymer lamina of the first region not extending into the second region.

25. The laminate structure of claim 22, wherein the fiber-reinforced polymer includes a fiber selected from a group consisting of aramids, polyolefins, glass, carbon, boron, and ceramics, and wherein the metal foil includes a metal selected from a group consisting of titanium, aluminum, alloys of titanium, alloys of aluminum, and alloys of iron.

26. The laminate structure of claim 22, wherein the first region includes a minimum-thickness portion, the second region being integrally coupled to the minimum-thickness portion and having a thickness approximately equal to the minimum thickness portion of the first region.

27. The laminate structure of claim 26, wherein second region consists essentially of one or more non-metallic layers.

28. The laminate structure of claim 22, wherein the polymer includes a resin.

* * * * *